United States Patent [19]
Landi et al.

[11] 3,875,002
[45] Apr. 1, 1975

[54] HIGHLY SPECIFIC TUBERCULIN

[75] Inventors: Silvio Landi, Islington, Ontario; Krishana Chandara Gupta, Willowdale, Ontario, both of Canada

[73] Assignee: Connaught Laboratories Limited, Willowdale, Ontario, Canada

[22] Filed: Jan. 14, 1974

[21] Appl. No.: 433,138

[52] U.S. Cl. .................. 195/29, 195/4, 260/112 R, 424/12
[51] Int. Cl. ............................................. C12d 7/00
[58] Field of Search .......... 195/4, 29, 66 R; 424/12, 424/92; 260/112 R

[56] References Cited
UNITED STATES PATENTS
3,621,005   11/1971   Ishidate et al. .................. 260/112 R

*Primary Examiner*—A. Louis Monacell
*Assistant Examiner*—R. B. Penland
*Attorney, Agent, or Firm*—George H. Riches and Associates

[57] ABSTRACT

A purified highly specific tuberculin, substantially free of protein, useful in the diagnosis of tuberculosis in humans and a process for preparing said tuberculin. Unlike known tuberculins, the aforesaid tuberculin is capable of being used to distinguish between tuberculosis-infected individuals and other individuals such as BCG-vaccinated individuals, and individuals infected with atypical mycobacteria of Runyon Groups I, II, III and IV. The average molecular weight of the purified highly specific tuberculin is lower than known tuberculins and in one embodiment of the purified highly specific tuberculin the average molecular weight is not more than 5000.

11 Claims, No Drawings

HIGHLY SPECIFIC TUBERCULIN

FIELD OF THE INVENTION

This invention relates to a highly specific tuberculin useful for determining the incidence of tuberculosis in humans, which is capable of distinguishing between individuals infected with *M. tuberculosis* and individuals infected with atypical mycobacteria of Runyon Groups I, II, III and IV and individuals vaccinated with attenuated *M. bovis vaccine*, (BCG) and a process for its preparation.

BACKGROUND OF THE INVENTION

In order to determine whether an individual is infected with tuberculosis, for many years a complex substance prepared from a culture filtrate of *Mycobacterium tuberculosis*, known as tuberculin, has been used. In one typical test, the individual tested is injected intracutaneously with a small dose of a tuberculin commonly known as "Old Tuberculin." If, after a few days, there is little or no redness or induration at the site of the injection, it is usually concluded that the individual has not been infected with *M. tuberculosis*. However, if there is sufficient redness or induration to be considered a positive reaction to the tuberculin, there is still some doubt that the individual is infected. The individual may have been administered an antigen, such as BCG vaccine, an attenuated *M. bovis vaccine*, to protect him against tuberculosis. He may have been infected with one or more atypical mycobacterium of broad or unknown origin including those usually known as Groups I, II, III and IV (Runyon), such as *M. Kansasii*, *M. scrofulaceum*, *M. intracellulare* and *M. fortuitum*. He may have been infected with *M. tuberculosis* in the past and developed delayed hypersensitivity as a result of the infection. This is not surprising when it is appreciated that Old Tuberculin is a heterogeneous substance containing substances whose molecular weight ranges from approximately 20,000 to more than 1,000,000.

In recent years attempts have been made to produce a purified, highly specific tuberculin which will only produce a positive reaction if the individual tested is infected with *M. tuberculosis*. However, none has been found to be specific enough in dosages considered acceptable to give a negative reaction in most individuals tested with the tuberculin who have been vaccinated with BCG vaccine or infected with atypical mycobacteria but are not infected with *M. tuberculosis*. A French Patent application No. 72.15877 applied for May 4, 1972 by Lincoln Inc. claiming a convention priority date of May 5, 1971 based on a United States patent application Ser. No. 140,444 in the name of William T. Kniker describes a method for preparing a specific tuberculin which does not positively react in guinea pigs infected with certain human strains of atypical mycobacteria. However, the application does not have any teaching in respect of BCG vaccinates. There is no reason to believe that it is not reactive with BCG vaccinates in doses commonly used in tuberculin tests.

Therefore, the object of this invention is to provide a highly specific tuberculin as an aid for diagnosing tuberculosis in humans which is capable of distinguishing between *M. tuberculosis* infected individuals and BCG vaccinated individuals, and a process for its preparation.

It is a further object of this invention to provide a highly specific tuberculin as an aid for diagnosing tuberculosis in humans which is capable of distinguishing between *M. tuberculosis* infected individuals and both BCG vaccinated and atypical mycobacterium infected individuals, and a process for its preparation.

BRIEF DESCRIPTION OF THE INVENTION

It has been found that a highly specific tuberculin which can be used to distinguish *M. tuberculosis* infected individuals from those vaccinated with BCG vaccine may be prepared by hydrolyzing a tuberculin with an alkaline active proteolytic enzyme, preferably trypsin, chymotrypsin or 'proteinase' (ICN Nutritional Biochemicals Corporation) removing protein from the resultant hydrolysate; and recovering a first peptide fraction from the remaining hydrolysate by separation with an ion exchange resin at pH3. It is preferable to start with a purified tuberculin, such as the one known as tuberculin PPD, (purified protein derivative) a process of preparation for which has been described in the article by S. Landi in Applied Microbiology 11,408, 1963. By the term protein we mean protein substances having a molecular weight of about 10,000 or more. The first peptide fraction has an average molecular weight of about 10,000 or less, preferably 5,000 or less. By the preferred method hereinafter described a highly specific tuberculin which may be used distinguish individuals infected with *M. tuberculosis* from those both vaccinated with BCG vaccine and infected with atypical mycobacteria of Groups I, II, III and IV may be prepared.

Said highly specific tuberculin of the invention may be prepared by incubating tuberculin PPD with an alkaline active proteolytic enzyme, preferably trypsin, chymotrypsin or a 'proteinase' (ICN Nutritional Biochemicals Corporation), thereby hydrolyzing said tuberculin. A fraction of the hydrolysate is selected which is soluble in trichloroacetic acid, preferably at a final concentration of 4 percent of trichloroacetic acid, and insoluble in phosphotungstic acid, preferably at a concentration of 2 percent. The phosphotungstic acid insoluble fraction is dissolved in aqueous barium hydroxide solution and a precipitate recovered by the addition of acetone. A frist peptide fraction is then recovered from a solution of this precipitate buffered at about pH3 , by ion exchange chromotography, using an ion exchange resin such as Dowex (Trademark) 50Wx8. This peptide fraction Purified Tuberculin Peptide (PTP) is the tuberculin of the invention. When vacuum dried and diluted with appropriate carriers it can be used to diagnose tuberculosis in humans. The process for its preparation will be more apparent from the following detailed examples.

DETAILED DESCRIPTION OF THE INVENTION

EXAMPLE I a. Preparation of Dried Tuberculin PPD

A stock solution of Tuberculin PPD was prepared according to the aforesaid published method described by S. Landi in Applied Microbiology 11,408, 1963. It was further purified by reprecipitating with 44% trichloroacetic acid (TCA) (final concentration 4 percent). The precipitate was twice washed with 1% TCA followed by two washings with acetone and ether respectively. The residue was dried in vacuum and was labelled as dried Tuberculin PPD.

b. Enzymatic Digestion of PPD

Two grams of dried Tuberculin PPD were dissolved in 100 ml of M/30 phosphate buffer ($Na_2HPO_4 \cdot 2H_2O$ pH 8.3). 40 mg of enzyme — 'proteinase' (ICN Nutritional Biochemicals Corporation) were added to the Tuberculin PPD solution and this solution was incubated at approximately 37°C for 18 hours. At the end of the incubation period, 44% trichloroacetic acid to produce a final concentration of 4 percent was added. The protein which precipitated was removed by centrifugation at 17,300 g for 30 minutes. To the supernatant liquid, 5 ml of 50% phosphotungstic acid was added with stirring. A heavy white precititate formed. The precipitate was removed and suspended in a saturated solution of barium hydroxide in approximately 3 times the volume of the wet precipitate. This mixture was shaken for five minutes. After centrifugation at 30,900 g for 30 minutes the supernatant was removed and neutralized with 0.1 N sulphuric acid. The addition of approximately 10 volumes of acetone to the supernatant resulted in the formation of a white precipitate. The precipitate was twice washed with acetone and dried in vacuum. Yield — 300 mg of tuberculin peptides mixture (TPM).

c. Fractionation of Tuberculin Peptides Mixture by Ion-Exchange Chromatography

Ion-exchange chromatography was used to fractionate the tuberculin peptides mixture. Dowex 50W × 8 resin was purified according to the method of Moore and Stein (See — Chromatography of amino acid on sulfonated polystrene resins *J. Biol. Chem.*, 192, 663, 1951).

Two hundred milligrams of tuberculin peptides mixture were dissolved in 5 ml of a pH 3.1 pyridine acetic acid buffer (32.3 ml pyridine and 557 ml glacial acetic acid diluted to 2 liters with distilled water). The sample was carefully layered on the top of the resin bed in the column (50 × 2cm). The flow rate was adjusted to 40 ml/hour and 5-ml volumes were collected. 0.5 ml effluent from each tube was analyzed for peptides using ninhydrin. The contents of those tubes showing highly positive reaction to ninhydrin in the first peak, that is, those fractions eluted by the pH3 elutant, were pooled. Other fractions shown in following Table 4 were eluted by using a similar buffer for acidities between pH3 and pH5, including pH5, but were not used to prepare the tuberculin of the invention. For example a buffer for pH5 was prepared from 322.5 ml pyridine and 286.5 ml glacial acetic acid diluted to 2 liters of distilled water. The pooled fraction 1 was evaporated to dryness in a rotary flask evaporator at 45° to 50°C under vacuum and then dried under vacuum. This material in dried form or a solution thereof, is the tuberculin of this invention and is called 'Purified Tuberculin Peptide' or PTP. In contrast to the tuberculin PPD, the tuberculin of this invention consists of material of relatively small molecular weight, when compared to the molecular weight of more than 20,000 for the tuberculin PPD.

EXAMPLE II

Two grams of dried tuberculin PPD prepared as already described were dissolved in 100 ml of M/30 sodium phosphate buffer. Twenty mg of trypsin TPCK (treated with L-tosylamido 2-phenylethyl chloromethyl ketone to inhibit contaminant chymotryptic activity) were added to the solution and this solution was incubated at 37°C for 18 hours. At the end of the incubation period 10 ml of 44% TCA were added. TCA-precipitated protein was removed by centrifugation at 17,300 g for 30 minutes. To the supernatant 5 ml of 50% phosphotungstic acid were added. The precipitate was suspended in a saturated solution of barium hydroxide in approximately 3 times the volume of the wet precipitate. The mixture was shaken for 5 minutes. After centrifugation at 30,900 g for 30 minutes the supernatant was removed and neutralized with $0.1N$ $H_2SO_4$. The addition of 10 volumes of acetone to the supernatant resulted in the formation of a white precipitate. The precipitate was twice washed with acetone and dried.

The tuberculin peptides mixture was separated by chromatography on Dowex 50W×8 ion-exchange resin

TABLE 1

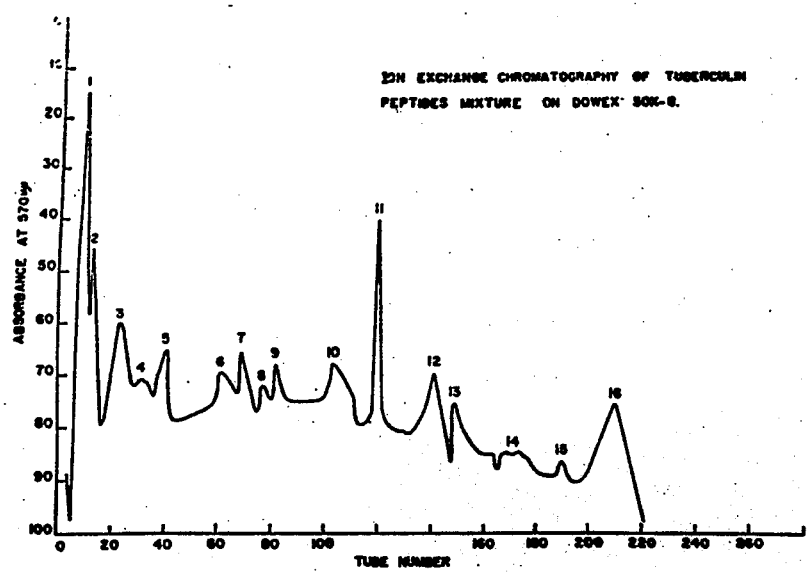

by using a gradient of 0.2 M pyridine acetic acid (pH 3.1) to 2M pyridine acetic acid (pH 5).

An 0.1 ml aliquot effluent from each tube was analyzed for peptides by using ninhydrin. For each peak the contents of the tubes showing a ninhydrin positive reaction were pooled. The pooled fractions were evaporated to dryness in a rotary flask evaporator at 45° to 50°C. The first peptide fraction recovered as in the previous experiment was designated PTP-tryptic.

EXAMPLE III

PTP-chymotryptic was prepared using the method of Example II but substituting chymotrypsin (Worthington Biochemical Corp.) for trypsin.

Table 1 shows a typical absorption spectrum at 570 millimicrons for the fraction of hydrolysate to be separated by ion exchange resin. The fraction numbered 1 is recovered in the process.

By examination by low speed ultracentrifugation and ultraviolet absorption optics, it was determined that the purified tuberculin peptides of Examples I, II and III had molecular weights in the order of 5,000 or less. This low molecular weight as compared to the average molecular weight of 20,000 or more for the tuberculin PPD is attributed to one or more of the steps of hydrolysis, removing protein and separation of the first peptide fraction with ion exchange resin.

The aforesaid preparations were tested for biological activity in guinea pigs sensitized with various atypical mycobacteria, namely: M. Kansasii, M. scrofulaceum and M. intracelluare. The first peptide fractions recovered in Examples II and III (PTP-tryptic and PTP-chymotryptic) as well as other peptide fractions recovered with the ion exchange resin at pH3, were tested in guinea pigs sensitized with BCG vaccine and M. tuberculosis var. hominis. When dosages commonly used in tuberculosis programs or indeed dosages twenty times as great of these peptide fractions were administered to guinea pigs sensitized with various atypical mycobacteria the guinea pigs did not positively react to any of said fractions. Only the first peptide fractions of Examples II and III as well as Example I showed specific tuberculin activity when tested in guinea pigs sensitized with BCG vaccine or M. tuberculosis. The first peptide fractions of Examples II and III were compared with the International Standard for tuberculin PPD (PPD-S) in guinea pigs for relative potency. The results of the tests with the aforesaid first peptide fractions are shown in Tables 2 and 3.

TABLE 2

Biological activity of PTP — tryptic

| Strain used for immunization | Sample | Dose (Tuberculin Units) | Skin Reaction in mm* | Relative potency |
|---|---|---|---|---|
| BCG | PTP tryptic | 20 TU 5 TU | 114 100 | 0.9 |
|  | Tuberculin PPD | 20 TU 5 TU | 115 102 | — |
| M.tuberculosis var.hominis | PTP tryptic | 20 TU 5 TU | 86 66 | .08 |
|  | tuberculin PPD | 20 TU 5 TU | 115 107 | — |

*sum of 4 readings in 4 guinea pigs of 2 perpendicular diameters

Table 3

Biological activity of PTP - chymotryptic

| Strain used for immunization | Sample | Dose (Tuberculin Units) | Skin Reaction in mm* | Relative potency |
|---|---|---|---|---|
| BCG | PTP-chymotryptic | 20 TU 5 TU | 105 85 | 0.58% (95% limits — 0.4 to 0.8) |
|  | PPD International Standard | 20 TU 5 TU | 120 90 | — |
| M. tuberculosis var.hominis | Chymotryptic peptide | 20 TU 5 TU | 79 64 | 0.13 (95% limits — 0.017 to 0.31 |
|  | PPD Tuberculin | 20 TU 5 TU | 102 87 | — |

*sum of 4 readings in 4 guinea pigs of 2 perpendicular diameters

A purified tuberculin peptide was prepared according to the process of example I of the invention and was clinically tested on humans. The preparation was dissolved in isotonic saline solution buffered at pH 7.4. The resultant solution conformed with recognized standards for clinical use. For example, it was sterile, had a bacteriostatic preservative and was pyrogen free. Four solution strengths were prepared, namely 1, 5, 100 and 250 International Tuberculin Units, as determined by weight, per human dose (0.1 ml.). However, only solutions containing 1 and 5 International Tuberculin Units per dose were used in the clinical tests. These solutions were compared against tuberculin PPD prepared in the applicants'to laboratory (PPD-I) and an independent laboratory regularly engaged in the production of tuberculin PPD (PPD-II). Three groups of individuals were tested:

i. Individuals with bacteriologically diagnosed tuberculosis;
ii. Individuals known to have been negative to 100 to 250 International tuberculin units of tuberculin PPD and to have been vaccinated with BCG vaccine within the last 3 or 4 months;
iii. Individuals known to give larger skin reactions to one of the atypical tuberculin PPD antigens such as PPD-Y(M. Kansasii origin), PPD-G (M. scrofulaceum origin), PPD-B (M. intracellulare origin) or PPD-F(M. fortuitum origin) than to conventional tuberculin PPD.

Each individual received 2 intracutaneous injections in each forearm as follows:

PPD — 1 tuberculin unit
PPD — 5 tuberculin units in one forearm, and
PTP — 1 tuberculin unit
PTP — 5 tuberculin units in the other forearm.

The tests were read 48 to 72 hours after injection. In some individuals there was no visible change while in others there was a red area of induration at the site of the injection. In those individuals in which there was such an area, the degree of response is reported as the diameter of the area in mm as is customary in studies of this nature. An area of 5 mm or more in diameter is usually considered positive.

The results of these tests are summarized in tables 4, 5 and 6 which follow:

Table 4

Observations in Group (i) — Individuals with Diagnosed Tuberculosis

| Product & Dose | Size of Response in mm | | | | Total | %5 mm or more |
|---|---|---|---|---|---|---|
| | 0 | 1-4 | 5-9 | 10 or more | | |
| PPD-I 1 unit | 0 | 0 | 1 | 54 | 55 | 100 |
| PPD-I 5 units | 0 | 0 | 1 | 47 | 48 | 100 |
| PPD-II 1 unit | 0 | 0 | 1 | 54 | 55 | 100 |
| PPD-II 5 units | 0 | 0 | 1 | 47 | 48 | 100 |
| PTP- 1 unit | 0 | 23 | 30 | 2 | 55 | 58 |
| PTP- 5 units | 0 | 1 | 42 | 5 | 48 | 98 |

Table 5

Observations in Group (ii) — Individuals Vaccinated with BCG Vaccine

| Product & Dose | Size of Response in mm | | | | Total | %5 mm or more |
|---|---|---|---|---|---|---|
| | 0 | 1-4 | 5-9 | 10 or more | | |
| PPD-I 1 unit | 50 | 5 | 19 | 27 | 101 | 46 |
| PPD-I 5 units | 21 | 3 | 25 | 72 | 121 | 80 |
| PPD-II 5 units | 0 | 2 | 11 | 7 | 20 | 90 |
| PTP- 1 unit | 101 | 0 | 0 | 0 | 101 | 0 |
| PTP- 5 units | 99 | 19 | 1 | 2 | 121 | 2 |

Table 6

Observations in Group (iii) — Individuals sensitized with atypical mycobacteria

| Product & Doses | Sizes of Response in mm | | | | Total | %5 mm or more |
|---|---|---|---|---|---|---|
| | 0 | 1-4 | 5-9 | 10 or more | | |
| PPD-I -1 unit | 4 | 0 | 1 | 3 | 8 | 50 |
| PPD-I -5 units | 3 | 0 | 0 | 5 | 8 | 62 |
| PTP- 1 unit | 8 | 0 | 0 | 0 | 8 | 0 |
| PTP- 5 units | 8 | 0 | 0 | 0 | 8 | 0 |

The results of Table 4 suggest that there is a relationship between the dosage and the response with the PTP tuberculin. A five-unit dose gave a positive response in 98 percent of the individuals tested who were diagnosed as having tuberculosis. The remaining 2% also responded but to a lesser degree. With tuberculin PPD although all individuals responded positively almost none of the individuals diagnosed as having tuberculosis gave a response in the 5-9 mm range, a size which is generally considered adequate for diagnosis.

The results of Table 5 indicate that conventional tuberculin PPD cannot generally distinguish between individuals infected with tuberculosis and those vaccinated with BCG vaccine since there was a positive response in a significant number of individuals who had been vaccinated with BCG vaccine. However, tuberculin PTP was able to distinguish between such individuals since almost none of the individuals tested with a 5-unit dose had a positive reaction to the tuberculin PTP.

Although the results of Table 6 are based on a small number of persons, the difference in specificity of the tuberculin PTP and tuberculin PPD is markedly apparent. None of the individuals infected with atypical mycobacteria had a positive response to the tuberculin PTP but a substantial number of these individuals gave a positive response to the tuberculin PPD.

Many variations in the preparation of the purified tuberculin peptide (PTP) of the invention will be obvious to a person skilled in the art and are included within the scope of this invention. Further, many variations in the form of the PTP of the invention will also be obvious to such a person and also included within the scope of the invention.

What we claim is:

1. A process for the preparation of a purified highly specific tuberculin peptide substantially free of protein comprising hydrolyzing a tuberculin PPD with an alkaline active proteolytic enzyme, removing protein from the resultant hydrolysate and recovering a first peptide fraction from the remaining hydrolysate by separation with an ion-exchange resin at about pH3.

2. A process according to claim 1 wherein the enzyme is one of the group consisting of trypsin, chymotrypsin and 'proteinase'.

3. A process according to claim 1 wherein the enzyme is trypsin.

4. A process according to claim 1 wherein the enzyme is chymotrypsin.

5. A process according to claim 1 wherein the enzyme is 'proteinase'.

6. A process according to claim 1 wherein the protein is removed from the resultant hydrolysate by precipitation.

7. A process according to claim 6 in which the tuberculin peptide has an average molecular weight of not more than 5,000, wherein the protein is removed from the hydrolysate by removing a first precipitate with trichloroacetic acid and then by removing a second precipitate from the resultant supernatant with phosphotungstic acid and recovering a peptide precipitate from an aqueous barium hydroxide solution of the second precipitate by precipitation with acetone.

8. A process according to claim 7 wherein the enzyme is selected from trypsin, chymotrypsin and 'proteinase'.

9. A purified highly specific tuberculin peptide substantially free of protein whenever prepared by the process of claim 1.

10. A process for the preparation of a purified highly specific tuberculin peptide substantially free of protein comprising hydrolyzing a tuberculin PPD with an alkaline active proteolytic enzyme, removing protein from the resultant hydrolysate and recovering a first peptide fraction from the remaining hydrolysate by separation with an ion-exchange resin at pH3.1.

11. A purified highly specific tuberculin peptide substantially free of protein whenever prepared by the process of claim 10.

* * * * *